Patented Jan. 16, 1923.

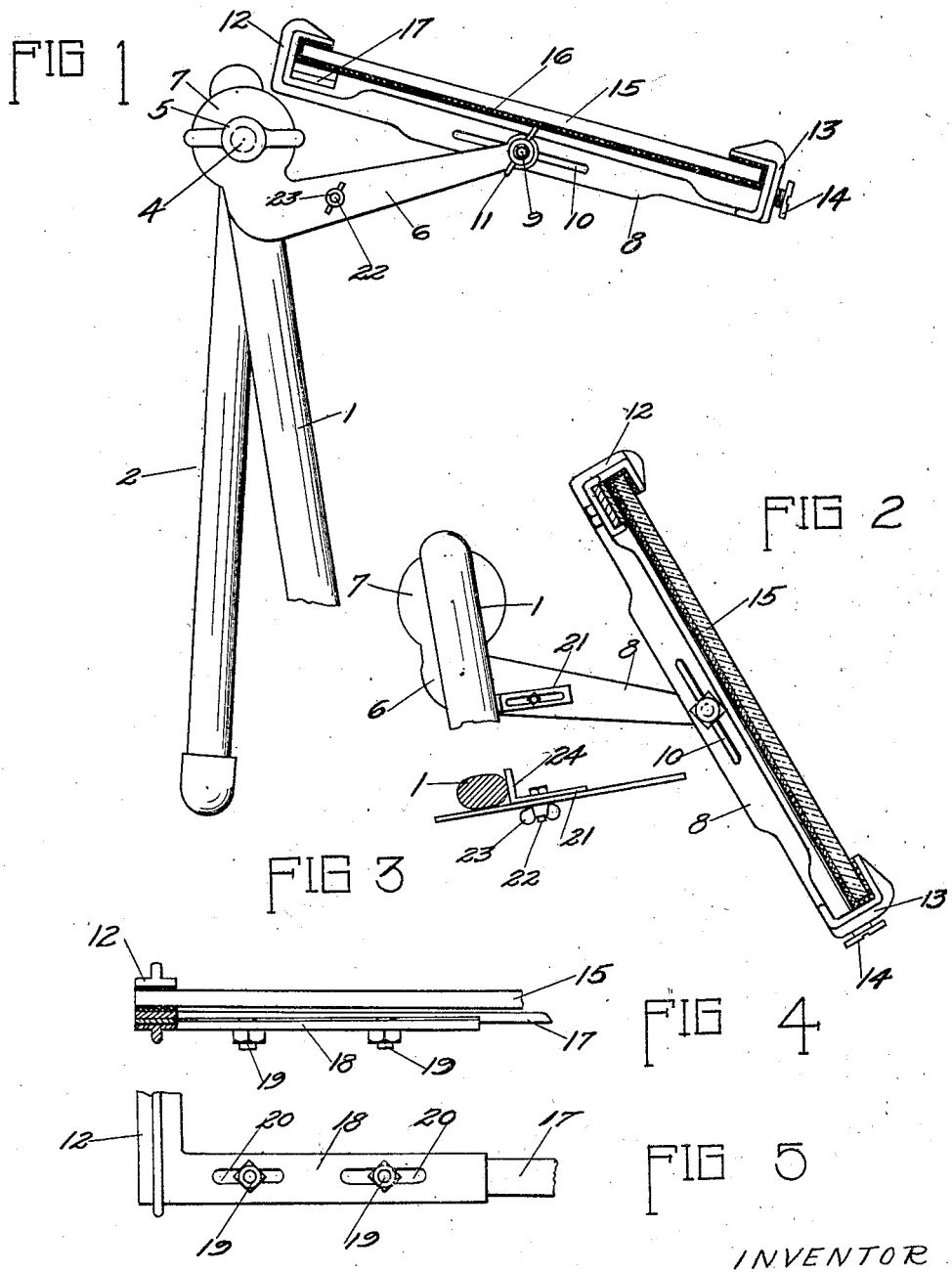

1,442,121

UNITED STATES PATENT OFFICE.

JOHN R. BRINCK, OF MOLINE, ILLINOIS.

SUN SHIELD AND SHADE FOR MOTOR VEHICLES.

Application filed September 1, 1920. Serial No. 407,514.

*To all whom it may concern:*

Be it known that I, JOHN R. BRINCK, a citizen of the United States, residing at Moline, in the county of Rock Island and State of Illinois, have invented certain new and useful Improvements in Storm Shields and Shades for Motor Vehicles, of which the following is a specification.

My invention relates to a storm shield and shade for automobiles, which is designed to be used as an auxiliary to the usual wind shield of an automobile. Its chief purpose is to provide a protection for the eyes of the driver and other occupants of the car, but it also serves as a protector for the upper part of the wind shield, to keep snow and rain therefrom.

Automobilists often encounter considerable inconvenience and difficulty in driving towards the sun, when it is only a short distance above the horizon, on account of being partially blinded thereby, and by the use of my invention this difficulty is overcome. The objection has been met to some extent by wearing a cap with a visor, to shade the eyes, but as the head of the wearer is not long held in one position, this has not been satisfactory.

The device can be easily and readily attached to automobiles now in use, and is capable of being adjusted in several ways, in order that the shield may be properly positioned.

In the drawings:

Fig. 1 shows my invention in side elevation, in position on a vehicle frame.

Fig. 2 is a vertical section thereof.

Fig. 3 is a detail of the clip 21. Fig. 4 is an edge view of the frame joint.

Fig. 5 is a side view thereof.

1 represents one of the supports of a windshield, partly broken away, and 2 the upper wind-shield frame, swingingly mounted in the supports. Projecting from the upper part of the support 1 is a bolt 4, provided with a thumb-cap 5. All of the parts just described are commonly provided on automobiles at the present time.

At each side of the car a bracket 6 is supported on the bolt 4, and held in place by the thumb-cap 5, such a bolt passing through a perforated head 7 on the bracket. On the inner faces of the brackets 6 are pivotally supported clamp-bars 8, by means of bolts 9 passing through the outer ends of the brackets and slots 10 in the bars 8. By means of thumb-nuts 11 on the end of the bolts 9 the brackets 6 and bars 8 can be held tightly together. At one end the bars 8 have fixed jaws 12 and at the opposite end movable jaws 13, which are connected with such bar by means of screws 14. Held between said jaws is a comparatively narrow strip of glass plate 15, which is formed of colored glass, or otherwise made semi-transparent. Said glass is separated from the bars 8 by means of a pad 16, of felt or similar material, to protect the glass from breakage which might result from vibration of the parts.

The bars 8 are united by an arm 17, connected at its ends with angular projections 18 of said bars, such parts being held together by means of bolts 19 passing through the arm 17 and slots 20 in the projections. The relative position of the bars 8 can thus be adjusted to strips 15 of varying lengths. This would be made necessary on account of the differing widths of wind shield frames in various types of automobiles.

The brackets 6 can be held at a desired angle with relation to the supports 1 by means of slotted plates 21, secured to the inner faces of the brackets by means of bolts 22, provided on the outside of the brackets with thumb-nuts 23, by tightening which the plates can be held rigidly in place. At their inner ends the plates 21 are provided with inwardly bent ends 24, which bear against the supports 8, holding the brackets from downward movement. It will be obvious that by this means said brackets may be held in adjusted positions with relation to such supports, as will appear from the different positions thereof in Figures 1 and 2. The clamp-bars 8 can also be held at different angles, by loosening the nuts 11, and tipping the same into the desired position, and again tightening the nuts. A further adjustment upwardly or downwardly is permitted by the slots 10.

For ordinary use the device is set near the upper part of the wind shield, as shown in Fig. 1. The upper edge of the shade is then about on a line with the lower edge of the vehicle top, and a protection is furnished against any glare coming to the eyes from above. In case the sun is near the horizon, and directly in front of the driver of the car, the glass can be tilted so that the lower edge thereof is just above the line of vision of the driver, so that the sun is visible through the glass. As a general thing, when the sun is quite near the horizon, just before it goes down, its rays are not dazzling, and no protection therefrom is required. The lowered position of the frame would be somewhat as shown in Fig. 2. The bracket 8 is also shown therein as being fixed in a lower position than in Fig. 1.

When held in the sloping position shown in Fig. 2 the strip 15 acts as a guard for the upper part of the wind-shield, preventing rain or snow from collecting thereon. This protects the driver from having his sight blurred or dimmed, as frequently occurs from an accumulation of water on the glass in front of him.

The shield 15 is not only a protection for the driver of a car, but it also makes it more comfortable for the other occupants of the vehicle, who whish to view the scenery in front thereof.

What I claim and desire to secure by Letters Patent, is:

1. In combination with the wind-shield of an automobile, and bolts projecting therefrom, brackets pivotally secured on said bolts; means for holding said brackets in adjusted positions thereon; clamp-frames provided with longitudinal slots midway their ends, and adjustably connected with the free ends of said brackets by means of pins passing through said brackets and slots; means for holding said clamp-frames in adjusted positions longitudinally thereof and rotatably of said pins; connecting members for said clamp-frames; and a strip of semi-transparent glass secured in said clamp-frames.

2. In combination with the wind-shield of an automobile, and bolts projected therefrom; brackets pivotally secured on said bolts; means for holding said brackets in adjusted positions thereon; means for limiting the downward movement of said brackets; clamp-frames provided with longitudinal slots midway their ends, and adjustably connected with the free ends of said brackets by means of pins passing through said brackets and slots; means for holding said clamp-frames in adjusted positions longitudinally thereof and rotatably of said pins; and a strip of semi-transparent glass secured in said clamp-frames.

In testimony whereof I affix my signature.

JOHN R. BRINCK.